United States Patent [19]

Dufort

[11] Patent Number: 5,024,079
[45] Date of Patent: Jun. 18, 1991

[54] TEST PLUG FOR FLANGED PIPES

[76] Inventor: Mario C. Dufort, 308 Eureka, Petrolia, Ontario, Canada, N0N 1R0

[21] Appl. No.: 338,936

[22] Filed: Apr. 12, 1989

[30] Foreign Application Priority Data

Jun. 8, 1988 [CA] Canada .................................. 568992

[51] Int. Cl.$^5$ ............................................ G01M 3/04
[52] U.S. Cl. ........................................ 73/49.8; 73/46; 138/90
[58] Field of Search ................ 73/49.8, 46, 49.1, 49.5; 138/90, 93, 94

[56] References Cited

U.S. PATENT DOCUMENTS

| 2,155,602 | 4/1939 | Keulers | 138/90 |
| 2,342,616 | 2/1944 | O'Brien | 73/46 |
| 2,443,944 | 6/1948 | Bean | 73/46 X |
| 2,873,764 | 2/1959 | Lombard et al. | 138/90 |
| 3,803,901 | 4/1974 | McConnell et al. | 73/49.8 |
| 4,381,800 | 5/1983 | Leslie | 73/49.5 X |
| 4,753,108 | 6/1988 | Jänsch | 73/49.8 |

FOREIGN PATENT DOCUMENTS 1049124 1/1959 Fed. Rep. of Germany .......... 73/46
1813589 6/1968 Fed. Rep. of Germany ........ 138/90

Primary Examiner—Hezron E. Williams
Assistant Examiner—Joseph W. Roskos
Attorney, Agent, or Firm—Mitches & Co.

[57] ABSTRACT

Significant time is wasted in proving the integrity of a weld associated with the welding of a flange onto a pipe. Generally this takes place by bolting the pipe into the circuit and testing the completed circuit. The test plug according to the invention discloses means for placing a seal internal of the pipe and connecting to a flange which has been welded to end of a pipe a flange plate and bolting the flange plate to the flange in the conventional manner. The test plug defines therethrough at least two channels one for conveying into the pipe bounded by the flange plate and the seal a testing media such a fluid or liquid and the other channel for purging the same. The immediate area around the weld can thus be tested for improper welding rather than requiring the total pipe link to be tested in situ.

11 Claims, 3 Drawing Sheets

TEST PLUG FOR FLANGED PIPES

This invention relates to a test plug for flanged pipes.

Flanged pipes are common in industrial applications for conveying liquids or fluids under certain conditions from one location to another commonly by pumping.

In the food processing and petro-chemical industries, flanged pipes are extensively used to convey liquids and fluids under pressures ranging upwards of 800 to 1000 psi while in sewerage applications 50 to 100 psi are common. In other industries, notably in food processing, flanged pipes are used both for pressure and for vaccuum feed lines.

One of the common problems is the testing of a flange recently welded onto a pipe end to ensure weld integrity. In new pipeline construction the flanges are welded and then lengths of the flanged pipe are bolted together, flange to flange and the whole system or link is then pressure tested prior to use. The bad welds are identified, the testing media removed, the pipes disassembled, and the bad welds are then rewelded. The link is reassembled, repressurized and tested. This cycle of testing may take place several times. Once tested, the internals of the pipe must be clean. In the food processing industry the circuit may be run for many days with a cleaning media to clean the interior of the pipeline of debris and contaminants.

It is inconvenient, a waste of time, and costly in unproductive man hours lost to remove all the testing media from the pipeline if perchance only one flange leaks since generally the pipelines may be several hundred feet to miles long.

It is not uncommon that several days may be lost in testing, venting and filling pipelines of testing media.

It is an object of the invention to eliminate the need to test the whole pipeline in order to test the integrity of a weld that attaches a flange to the end of a pipe.

The invention therefore contemplates a test plug for proving the integrity of an annular weld that sealingly attaches an annular flange, defining bolt accommodating apertures, comprising:

(a) a barrel defining a core channel and having a distal end and a proximate end;

(b) an annular member with exterior diameter greater than that defined by the barrel, the annular member defining:

(i) a central channel communicating with the barrel core channel;

(ii) first and second channels communicating through the annular member at a radius greater than an exterior of the barrel;

(c) a seal carrying an annulus adapted to mate with the distal end of the barrel and providing seating means;

(d) a shaft having at its distal end a disk carrying seating means, the shaft adapted to extend through the barrel and to occupy the central channel and to protrude from the annular member (b) and to provide thereon, at its proximate end, means adapted for connection;

(e) connection means adapted to engage the means adapted for connection and to urge against the annular member (a) and to cause the relative positioning of the annulus (b) and disk so as to flex the cylindrical elastomeric seal into sealing engagement with the interior of a pipe to be tested.

The invention further contemplates that the barrel have an exterior diameter with first and second channels communicating through the annular member with the radius greater than that of the barrel. In one embodiment the barrel and shaft are straight and in another embodiment are arcuate and in yet a further embodiment the shaft is flexible.

The invention also contemplates a method of proving the integrity of an annular weld that sealingly fixes the flange defining bolt accommodating recesses to the end of a cylindrical pipe comprising the steps of:

(a) placing a first sealing member into the cylindrical pipe, a predetermined distance from the flange so that the seal closes the interior of the pipe;

(b) placing a second sealing member defining at least two channels therethrough, over the flange to sealingly close the same thereat and to define a plenum between each sealing member and the cylindrical pipe;

(c) conveying a test media through one channel while purging the contents of the plenum through the other channel until the plenum is filled with test media;

(d) closing the second channel so as to pressurize the plenum with testing media whereby to determine if test media flows through the weld so as to thereby determine the integrity of the weld.

The invention will now be described by a way of example and reference to the accompanying drawings in which.

Figure 1:
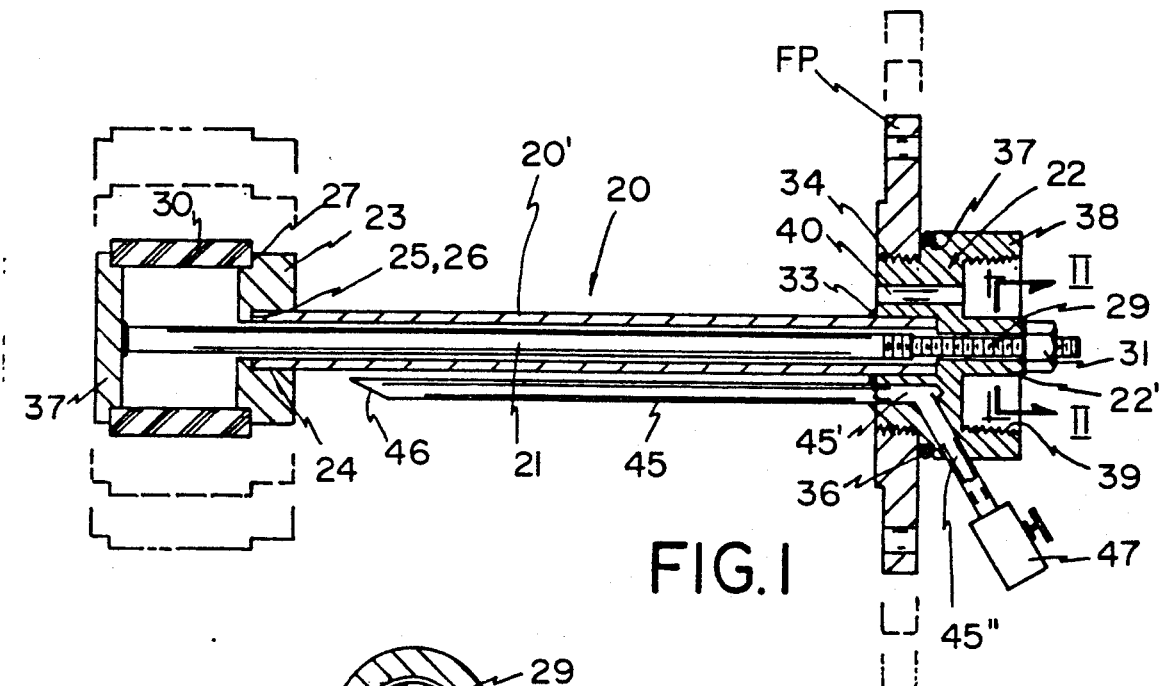
FIG. 1 is a cross-sectional longitudinal view of the test plug according to the invention.
Figure 2:
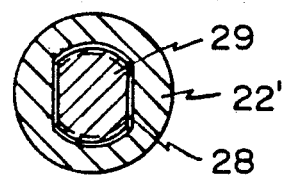
FIG. 2 is a section along II—II of FIG. 1.
Figure 3:
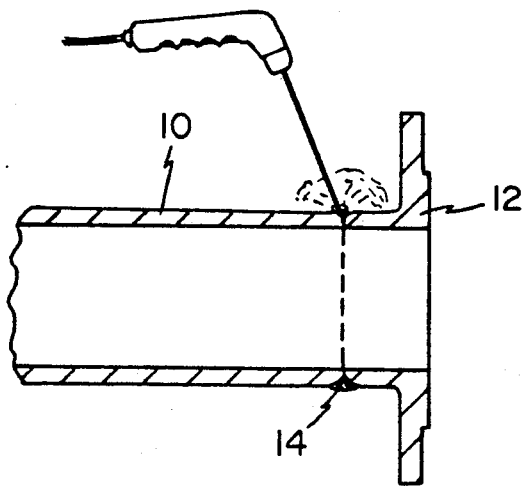
FIG. 3 is a longitudinal cross-section of the welding sequence of a flange onto the end of a pipe.
Figure 4:
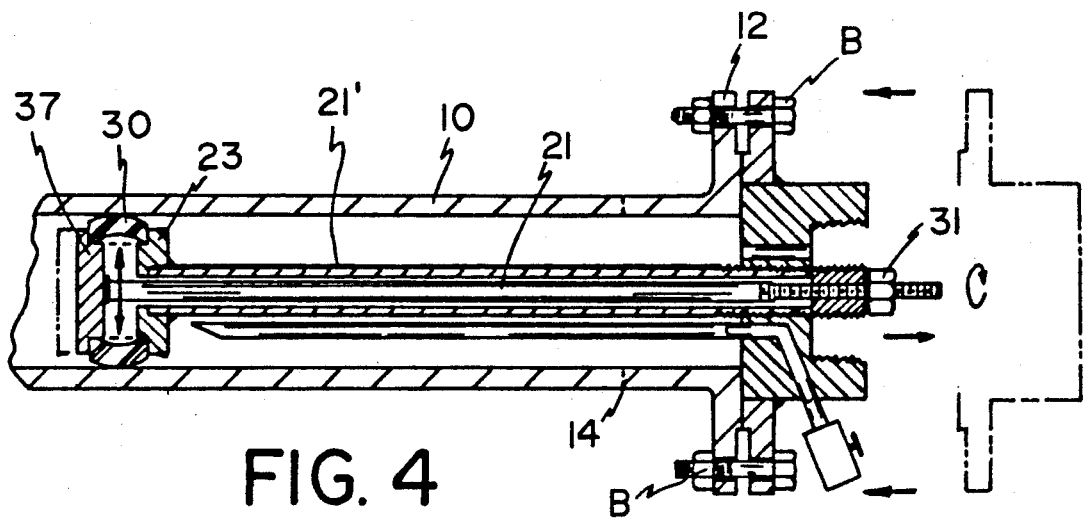
Figure 5:
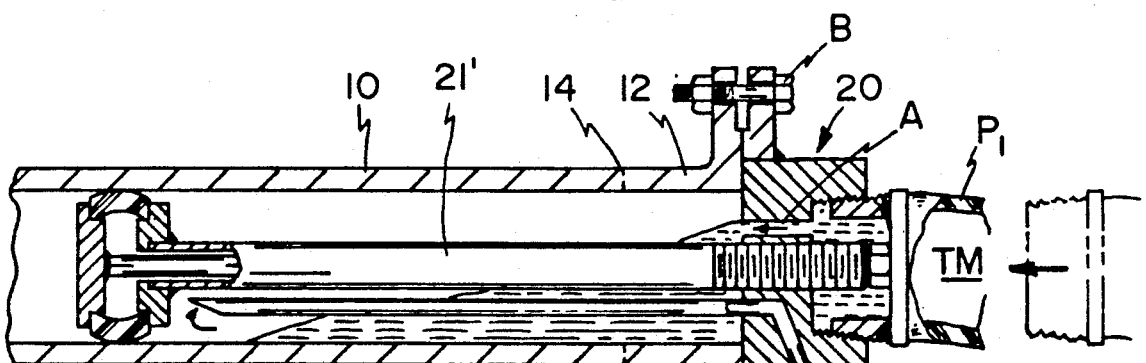
Figure 6:
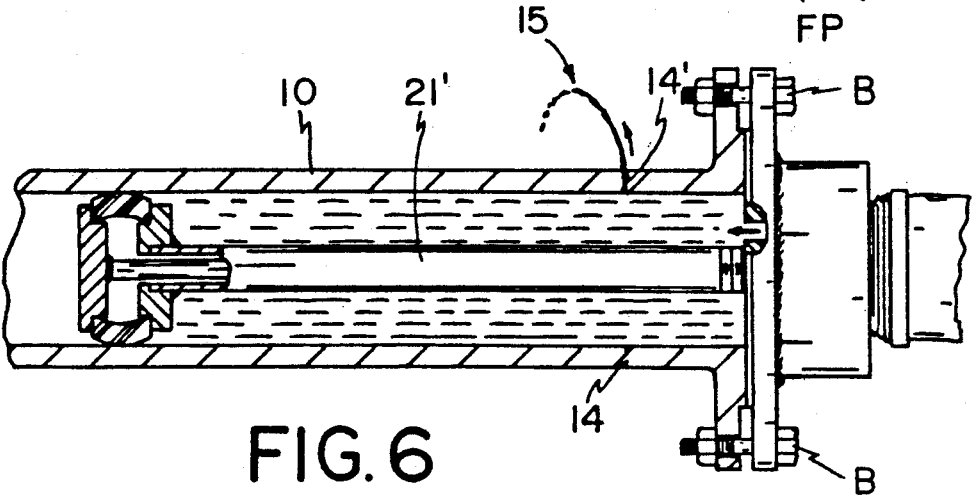

FIGS. 4, 5, and 6 illustrate the installation sequence of the test plug of FIG. 1 to the flange pipe of FIG. 2 after the flange of FIG. 3 has been affixed thereto.

Figure 7:
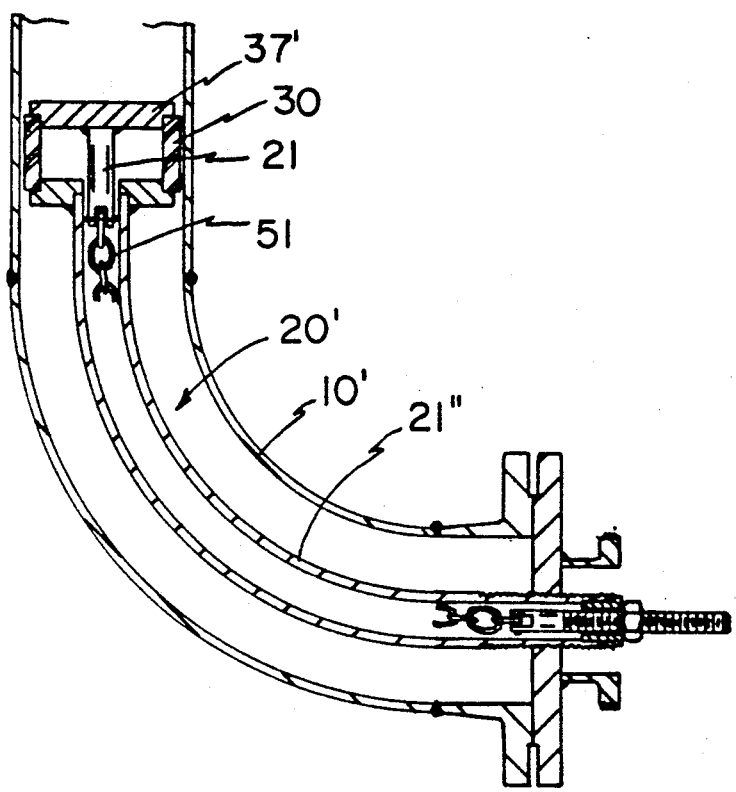

FIG. 7 is a section of an alternative embodiment of plug plug for use with curved or bent pipe.

Referring to FIG. 3, a pipe 10 has its end ground smooth and then a prefabricated flange 12 is welded as shown to the pipe 10 in the conventional manner so as to form a beaded weld seam 14 therearound. The weld or seam 14 must be homogeneous and leak proof and thus first must be tested.

Referring to FIG. 1, my novel test plug is generally shown as 20, and consists of a hollow cylindrical barrel 20' with one end welded to a formed annular collar 22 and carrying at its other distal end 26 a flat annular surface that mates with a removable annular retainer 23 as it has a stepped central bore 24 sized to fit over the barrel 20', and an inner shoulder 25 adapted to urge against the distal flat annular surface end 26.

The opposite surface of the retainer 23 has an outer annular shoulder 27 sized to the inner diameter of an elastomeric cylindrical seal 30 while the outer diameter of the retainer 23 is less than the outer diameter of the seal 30.

A shank 21 carries, at its distal end, a retaining disc 37 sized and shaped complimentary to the retainer 23. The shank 21 extends through the barrel 20' and out a shaped central aperture 28 defined by a central annulus 22' of the collar 22, as a threaded shaft 29 of irregular but mating cross-section, as more particularly seen in FIG. 2. As is clear from FIG. 1, the collar 22 is welded to the barrel 21' at 33 and defines an inner radial thread at 34. Onto this thread 34 may be also threaded an annular flange plate FP of various diameters so as to accomodate various diameters of flanges FP for testing. The flange plate FP has its front face mating against an O-ring 36 nesting in a race 37 defined in part by collar 22 and by the front face of the flange plate FP. The collar 22 extends forward steping into a large recessed annulus 38 defining an inner radial thread 39 which is adapted to accommodate the thread of a pipe or hose, P₁, as shown in FIG. 5, for testing of the weld 14. In this respect the collar 22 defines a test media communicating channel 40 that communicates one side of the flange plate FP to the region defined by the inner radial threads 39 and the internal space of the pipe 10 (see FIGS. 4, 5 and 6). A bleed tube 45 extends the adjacent shank 21 locating its distal communicating end 46 near the retainer 23. The bleed tube 45 communicates through the collar 22 via channels 45' and 45" to a bleed vent tap 47, which allows purging of the internal space of the pipe 10 in the immediate area surrounding the weld 14, in a manner as will be described.

The flange FP may come in various sizes as indicated in phantom in FIG. 1 and hence the threads 34 have the advantage of allowing flanges of different diameters to be threaded on and off as may be required. Similarly the retaining disk 37 and the angular retainer 23 may be replaced with those of different sizes so as to accomodate various diameters of annular elostomeric seals 30 to be used (also as indicated in phantom FIG. 1).

Now referring to FIG. 4, the assembled test plug 20 is placed into the pipe 10 as shown and the nut 31 turned down on a threaded shaft 29 of the shank 21. In accordance with the arrow shown, this draws to the right the shank 21 and into relatively closer proximaty, the retainer 23 and disc 37 thereby applying pressure onto the ends of the cylindrical elastomeric seal 30 forcing it bulge, as shown, and to sealing urge against the interior wall of the pipe 10. Prior to this sealing of the elastomeric seal 30 against the interior wall of the pipe 10 bolts B are past through the flange plate FP and the flange 12 and turned down by nuts threadingly mating with the bolts to seal the flange plug 20 to the pipe 10.

As shown in FIG. 5 a flexible pipe P₁ has its threaded male end threaded into the female threads 39 of the collar 22 and a test media (water or the like) is caused to be flowed therein, see arrow "A", while at the same time the bleed port 47 is opened to bleed out any air within the pipe located between seal 30 and flange plate FP. The pressure is increased, and referring to FIG. 6, if there is a leak in the weld 14', the test media TP issues out as lost liquid 15. It will be apparent to those skilled in the art that the test media can be removed and the sequence reversed so that the weld 14 can be rewelded and then the pipe retested again in the manner as aforesaid.

It will be seen that according to the invention therefore, the need to completely fill the flanged pipe with media and to bolt both flange pipe sections together and to test the whole link is clearly avoided. In otherwords, each pipe flange is welded to its pipe and the weld checked first according to the invention and thereafter the segments of flange pipe bolted together to complete the total pipeline.

Referring to an alternative embodiment of the invention and to FIG. 7 a bent flange pipe 10' is shown and a modified curved pipe 20' place therewith as shown. In structured principal, the curved pipe flange 20' is identical to that of FIGS. 1 through 6 save and except the hollow cylindrical housing 21' is arcuate as 21" and the shaft 31 eliminated and replaced by a chain link 51 which connects to a truncated shaft 21 were there is welded at its distal end stepped disk 37 as shown. In this particular embodiment the curved test plug 21' is sized for specific interior diameter of the curved pipe and 10' and hence various sizes of curved test plug 20' are needed in order to accommodate the various sizes of curved flange pipe as those skilled in the art will now appreciate. In any event, it is clear from this figure and those of FIGS. 1 through 6 that various variations to the invention may be made without deviating from the embodiments of the invention as claimed.

The embodiment of the invention in which an exclusive property or privilege is claimed are defined as follows:

1. A test plug for proving the integrity of an annular weld of a pipe having an inner wall that sealingly attaches an annular flange, defining bolt accommodating apertures, comprising:

(a) a barrel defining a core channel and having a distal end and a proximate end;

(b) an annular pipe attachment member sealingly attached to the proximate end and adapted to seal with said annular flange and having exterior diameter greater than that defined by the barrel, the annular pipe attachment member defining:

(i) a central channel communicating with the barrel core channel;

(ii) first and second channels defined by and communicating through the annular pipe attachment member at a radius greater than the inner radius of the barrel;

(c) an annulus adapted to mate with the distal end of the barrel and providing a first seal seating means adapted to seal against the inner wall of the pipe to be tested at a predetermined distance from the flange;

(d) a shaft having at its distal end a disk carrying a second seal seating means, adapted to engage a resilient annular seal, the shaft adapted to extend through the barrel and to occupy the central channel and to protrude from the annular pipe attachment member and to provide thereon, at its protruding proximate end, means adapted for connection;

(e) the resilient annular seal adapted to mate with the seating means and the second seal seating means; and (f) connection means adapted to engage the means adapted for connection and to urge against the annular pipe attachment member and to cause the relative positioning of the annulus and disk so as to flex the resilient seal into sealing engagement with the inner wall of the pipe to be tested.

2. The test plug as claimed in claim 1 wherein the barrel and shaft are straight.

3. The test plug as claimed in claim 2 wherein the central channel through the annular pipe attachment member has a shaft mating means adapted to engage the shaft while a segment of the shaft extending through the annular pipe attachment member is profiled to mate and index with said shaft mating means thereby to inhibit rotation of the shaft.

4. The test plug as claimed in claim 1 wherein the barrel is arcuate and the shaft is arcuate.

5. The test plug as claimed in claim 4 wherein the central channel through the annular pipe attachment member has a shaft mating means adapted to engage the shaft while a segment of the shaft extending through the annular pipe attachment member is profiled to mate and index with said shaft mating means thereby to inhibit rotation of the shaft.

6. The test plug as claimed in claim 1 wherein the shaft is flexible.

7. The test plug as claimed in claim 6 wherein the central channel through the annular pipe attachment member has a shaft mating means adapted to engage the shaft while a segment of the shaft extending through the annular pipe attachment member is profiled to mate and index with said shaft mating means thereby to inhibit rotation of the shaft.

8. The test plug as claimed in claim 1 wherein the shaft is a chain link.

9. The test plug as claimed in claim 8 wherein the central channel through the pipe attachment member has a shaft mating means adapted to engage the shaft while a segment of the shaft extending through the annular pipe attachment member is profiled to mate and index with said shaft mating means thereby to inhibit rotation of the shaft.

10. The test plug as claimed in claim 1 wherein the central channel through the annular pipe attachment member has a shaft mating means adapted to engage the shaft while a segment of the shaft extending through the annular pipe attachment member is profiled to mate and index with said shaft mating means thereby to inhibit rotation of the shaft.

11. A method of proving the integrity of an annular weld that sealingly fixes the flange defining bolt accommodating recesses to the end of a cylindrical pipe comprising the steps of:
   (a) placing a first sealing member into the cylindrical pipe, a predetermined distance from the flange so that the seal closes the interior of the pipe;
   (b) placing a second sealing member defining at least two channels therethrough, over the flange to sealingly close the same thereat and to define a plenum between each sealing member and the cylindrical pipe;
   (c) conveying a test media through one channel while purging the contents of the plenum through the other channel until the plenum is filled with test media;
   (d) closing the second channel so as to pressurize the plenum with testing media whereby to determine if test media flows through the weld so as to thereby determine the integrity of the weld.

* * * * *